Feb. 2, 1943.　　　　C. S. WEYANDT　　　　2,310,185
RECIPROCATORY MOTOR AND METHOD OF CONTROL THEREOF
Filed Dec. 17, 1940　　　2 Sheets-Sheet 1
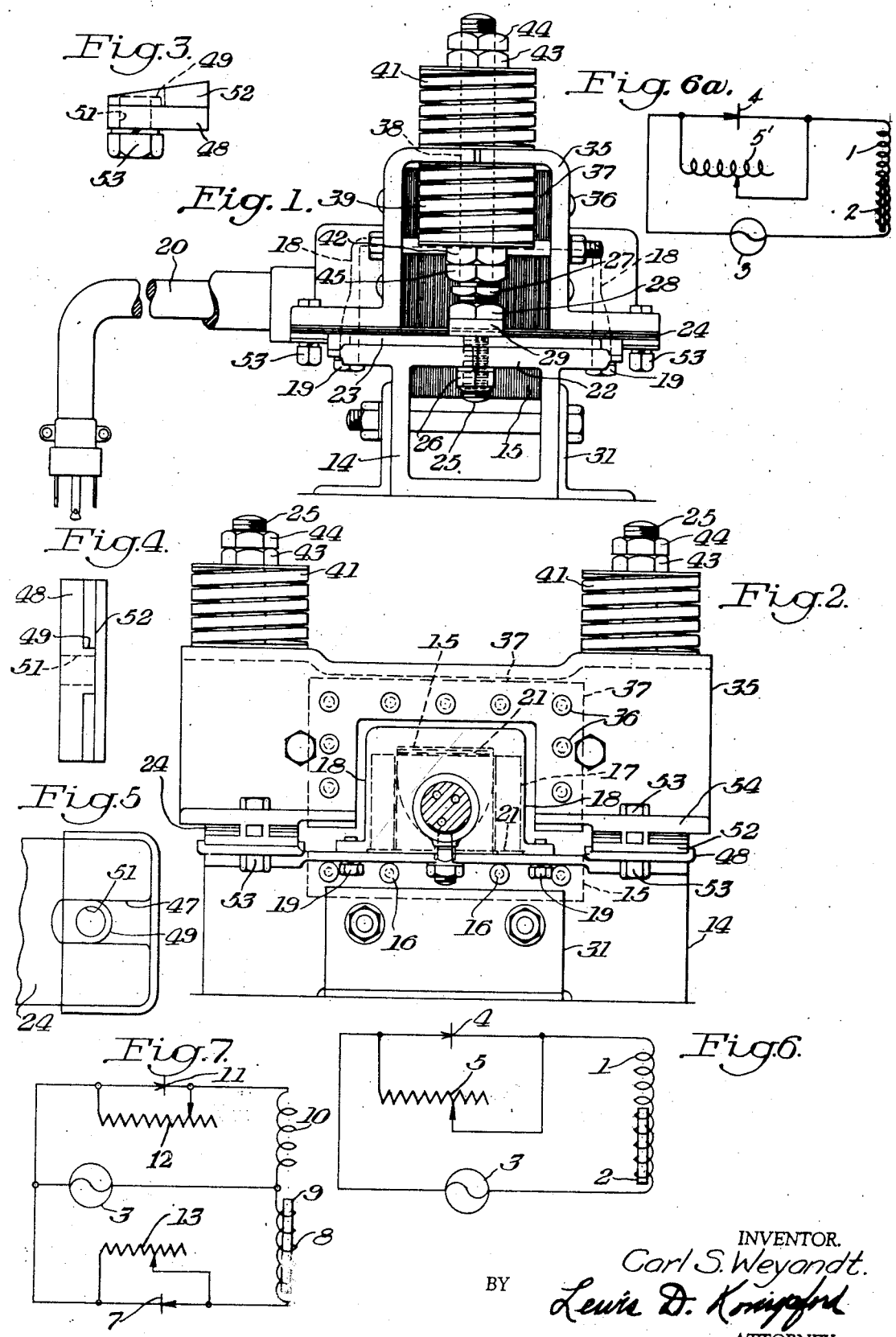
INVENTOR.
Carl S. Weyandt
BY Lewis D. Koningsford
ATTORNEY.

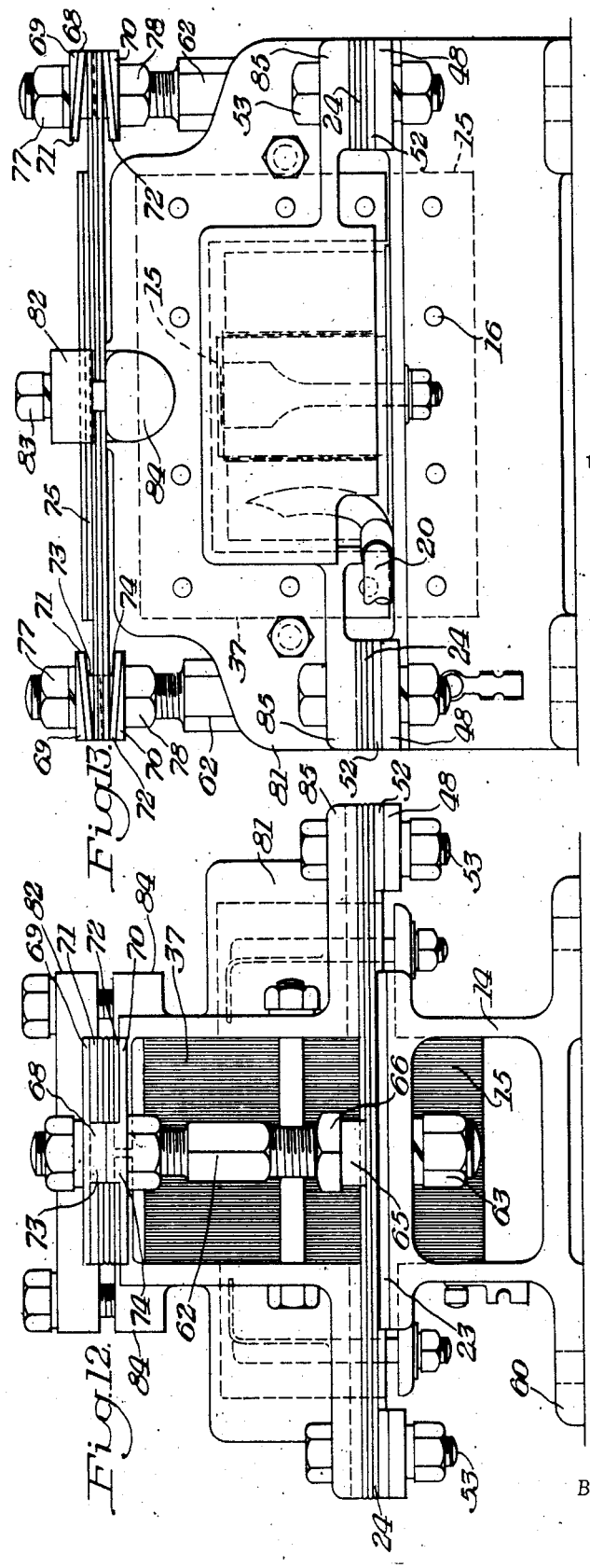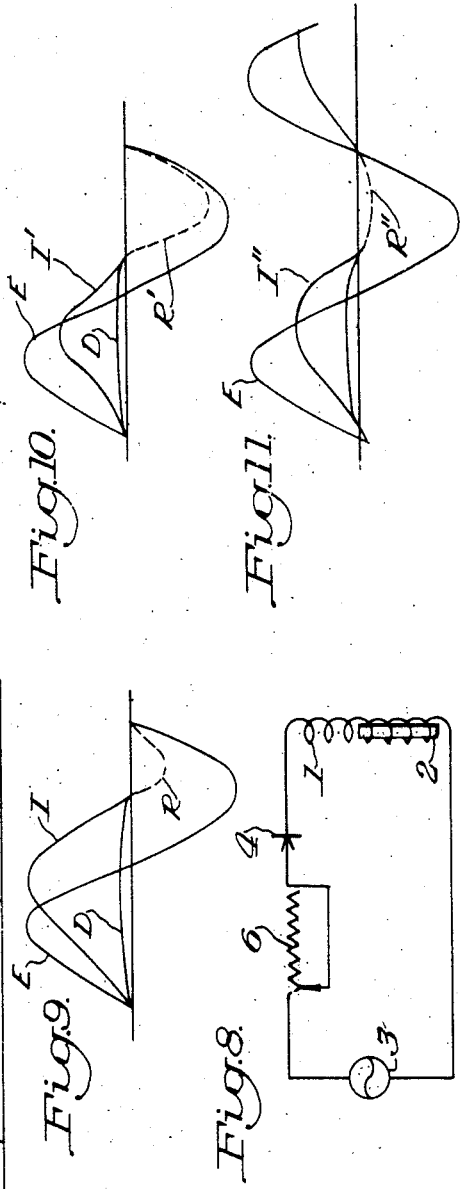

Patented Feb. 2, 1943

2,310,185

UNITED STATES PATENT OFFICE

2,310,185

RECIPROCATORY MOTOR AND METHOD OF CONTROL THEREOF

Carl S. Weyandt, Homer City, Pa.

Application December 17, 1940, Serial No. 370,465

15 Claims. (Cl. 172—240)

My invention relates to the control of electromagnetic vibratory or reciprocatory motors of that type which comprises a free or captive armature and an electromagnet core that is periodically energized to effect vibratory movements of the armature.

The invention also relates to the construction and control of electromagnetic vibrators designed and intended for vibrating various types of objects such as vibratory tables and screens, molds of various types, and chutes and spouts through which powdered or finely divided material is fed, or as an impact member for operating cutting or drilling tools or the like.

One object of my invention is the provision of a control means for vibratory or reciprocatory motors of the type operated by current impulses separated by substantial zero intervals and derived from an alternating current source through a rectifier, whereby a smaller rectifier than heretofore required may be employed, and whereby the electrical power delivered to the motor may be varied.

A further object is the provision of control means for vibratory or reciprocatory motors of the type operated by current impulses separated by substantial zero intervals and derived from an alternating current source through a rectifier, comprising a resistance or an impedance shunted across the rectifier, whereby the inverse voltage applied to the rectifier is greatly reduced.

Another object is the provision of a vibratory motor having means for adjusting the air gap between the armature and electromagnet.

A further object is the provision of a vibrator having novel spring means and mounting therefor for connecting the vibrating armature to the base.

Other objects of my invention are to provide a vibrating apparatus that is of simple and rigid construction, economical to manufacture, of small size and light weight, and which can be readily applied to a variety of apparatus with which it is adapted for use.

The preferred embodiments of my invention are shown in the accompanying drawings by way of example, wherein Figure 1 is an end view of a preferred vibrator construction, Figure 2 is a side elevation of the vibrator shown in Figure 1, Figures 3, 4 and 5 are elevations of a detail, Figure 6 shows a wiring diagram representing the preferred embodiment of my control system applied to a single coil motor, Figure 6a shows a modification of the invention employing an inductance, Figure 7 shows a wiring diagram representing a further preferred embodiment of my control system applied to a motor employing two coils, Figure 8 is a wiring diagram showing a known control system, Figures 9 and 10 are oscillograms showing the properties of the control system of Figure 8, Figure 11 is an oscillogram showing the properties of a control system in accordance with the present invention, Figure 12 is an end view of a further preferred vibrator construction, and Figure 13 is a side elevation of Figure 12.

Referring to Figure 6 of the drawings, I have shown a preferred modification of a control circuit according to the present invention for a vibratory or reciprocatory motor. The coil 1 of a reciprocatory or vibratory motor acts upon an armature 2 which may be free or secured to a spring, and coil 1 is connected to an alternating current source 3 through a rectifier 4 of any suitable type, and an adjustable impedance 5 shown as a resistance is shunted across the rectifier terminals. This impedance preferably is relatively high. In place of the resistance 5 an adjustable inductance may be employed. A suitable control switch (not shown) may be included in the circuit.

The manner in which this control circuit cuts down the inverse current will be apparent upon reference to Figures 8 to 11. Referring to Figure 8, I have shown a known circuit in which the coil 1 of the motor is connected to the alternating current source 3 through the rectifier 4, and the adjustable resistance 6 is in series with the rectifier. Figure 9 shows the current and voltages acting on the rectifier in such circuit. The curve E represents the alternating voltage impressed on the rectifier, curve I represents the rectified current wave or impulse that passes through the rectifier, and the amplitude of curve D represents the voltage drop across the rectifier due to the current I passing through it. When the maximum current I is supplied to the coil 1, the amplitude of curve R represents the back voltage drop across the rectifier between successive current impulses. If it is desired to reduce the power delivered to the coil, the resistance 6 is increased, and the effect of an increased resistance in series with the coil is shown in Figure 10. The supply voltage E remains the same, and the amplitude of the rectified current is decreased as indicated by the curve I', thus decreasing the power of the vibrator. However, at the same time the amplitude of the back voltage drop between successive current impulses increases as indicated at R'. Therefore, in a circuit of this type a rectifier must be selected such that it will resist the high inverse voltage existing when the motor is operating under minimum power. In using dry rectifiers, as for example, the copper oxide, copper sulphide or selenium type, the result is that more disks must be used when the power is cut down than when the power is increased. However, as it is impractical to change the number of disks each time the power is changed, a sufficient number of disks are always employed to enable the motor to be operated at its lowest power.

The effect in the control system in accordance with my invention, wherein the resistance or impedance 5 is shunted across the rectifier, as shown in Figure 6, will be apparent upon reference to Figures 9 and 11. Referring to Figure 11 and assuming the same alternating voltage E supplied to the rectifier, and a suitable high value of resistance 5 selected to supply a current I to the coil, the inverse voltage will be represented by the amplitude of curve R in Figure 9. Now, when the resistance 5 is decreased it allows inverse current to leak around the rectifier and through the coil 1, and thus cuts down the current I'' supplied to the vibrator and the value of the inverse voltage as shown by the curve R'' in Figure 11 decreases instead of increasing as in Figure 10. The result is that when the resistance is in series the inverse voltage is a maximum when the current supplied to the motor is a minimum, whereas according to my invention, when the resistance or impedance is in parallel the inverse voltage is a maximum when the current supplied to the motor is a maximum, and the inverse voltage is a minimum when the current supplied to the motor is a minimum. As a consequence, in using the system of my invention, the rectifier need only be large enough to withstand the inverse current at maximum power, whereas according to the system previously employed, the rectifier must be made much larger to obtain maximum power because of the high inverse voltage at low power.

As an example, it has been found in applying the invention to operation of a vibrator, such as shown in Figures 1 and 2, with a resistance in series and the vibrator operating at low power from a 120 volt alternating source, the maximum inverse voltage across the rectifier was 88.5 volts and it required three rectifier units, each containing five discs in series or a total of fifteen discs. With a resistance in parallel according to my invention, as shown in Figure 6, and the resistance set to deliver the same low power, the inverse voltage was 23.5 volts and it required only 5 discs in series, thus reducing the number of discs by two thirds. This, of course, reduces the price of the rectifier unit by about two thirds. A further advantage resides in that the current loss also is reduced. In the modification illustrated in Figure 6a, a variable inductance 5' is shunted across the rectifier 4, this inductance being preferably high.

In Figure 7 I have shown how my invention may be applied to a reciprocatory or vibratory motor employing an armature and two coils. One current wave passes from alternating voltage source 3 through coil 8 and rectifier 7 to move the armature 9 in one direction, and the other current wave passes through coil 10 and rectifier 11 to move the armature in the opposite direction thus producing two magnetic fields The adjustable resistance 12 is in parallel with the rectifier 11 and controls the current through coil 10, and the resistance 13 is shunted across rectifier 7 and controls the current through coil 8.

I prefer to employ the dry disc type of rectifier, such as copper oxide, copper sulphide, or selenium disc. However, any other suitable type of rectifier may be employed. For example, thermionic rectifier valves employing an anode and a heated cathode may be used on higher voltages without flash over when the resistance is in shunt with the valve. As examples of the motors which may be controlled in this manner, I may further mention by way of illustration those described in United States Patent No. 1,680,311, No. 817,403, No. 1,655,482, No. 1,651,306, and No. 1,637,717, and synchronous rotary motors.

The coil 1 may be that of a vibrator of the impact or inertia type or of a conveyor or screen motor, or of a hammer, tie tamper, impact drill or the like, and it will be understood that the invention is also applicable to apparatus or motors employing a single coil providing an alternating field or motors employing two or more coils or two or more rectifiers.

Referring to Figures 1 and 2, I have shown a preferred type of motor employing a captive armature which may be operated and controlled according to the present invention. The motor is constructed to serve as a vibrator and comprises a base assembly made of a flanged channel shaped base 14 within which is set the electromagnet core 15 made of a group of inverted T-shaped laminations secured in place by means of rivets 16 passing through the core and the sides of base 14. The base may be made of a magnesium alloy casting, for strength and lightness, or of steel if desired, and the electromagnet core may be of laminated silicon steel or other suitable magnetic material of low retentivity. A core winding or coil 17 surrounds the leg of the core 15 and is held in place thereon by a pair of angle plates 18 which are bolted at 19 to the base. By means of a cable 20 the coil 17 may be connected to a suitable source of power. Suitable insulating discs or washers 21 are provided at the upper and lower ends of the coil 17.

The ends of the base channel 14 have integral flanges 22 having holes therein, and an anvil plate 23 preferably of non-magnetic metal such as stainless steel or bronze is supported thereon at each end. A group or set of spring leaves 24 of magnetic or non-magnetic material, such as for example, a chromium nickel alloy, are secured at their middle to the anvil plates 23 at each end of the base by bolts 25 preferably of non-magnetic material, which extend through the flanges 22 and anvils 23 and have nuts 26 at their lower ends. The bolts 25 have a hexagonal shoulder 27 and are threaded at each end. An adjustment nut 28 threaded thereon engages the grooved clamp piece 29 and the spring leaves and anvil plates are thus clamped to the base between the nuts 26 and 28 at each end of the base. Angle plates 31 are bolted to the base and provide a means for securing the base assembly to the object to be vibrated.

The armature assembly comprises a flanged casing 35 of inverted U-shape made up of two halves. Rivets 36 hold the casing halves and an armature 37 made up of a plurality of inverted U-shaped laminations together. Holes 38 are provided in the casing 35 at the ends to receive the bolts 25 and coil springs 39 at each end located around bolts 25 support the armature assembly. Coil springs 41 at each end are placed around bolts 25 above the armature assembly and springs 39 and 41 are compressed between adjustment nuts 42 and 43 the desired amount, lock nuts 44 and 45 holding the nuts 42 and 43 respectively in adjusted position.

The springs 24 have open-ended slots 47 at their extremities, which are received in spring clips secured to the armature casing. These clips comprise a steel plate 48 having a boss 49 on the inner side and a hole 51 therethrough, and a pad 52 of rubber is vulcanized or otherwise suitably secured thereto. The rubber pad 52 preferably is tapered. A bolt 53 passes through the flange 54 of the armature casing and through the hole 51 of the spring clip to retain the clip on the casing. The boss 49 engages the lower face of flange 54 so that in assembled position the spring leaves are not rigidly clamped in the clips, but are free to move endwise as they are flexed.

As the ends of the leaf springs in this construction are free to move, the rubber pads provide a cushion keeping the ends firm and tight at all times yet allowing movement of the spring ends. This avoids wear and the gradual loosening of the springs, and also eliminates the noise or rattle heretofore due to the springs striking the sides of the clips.

The armature assembly thus is secured to the base assembly by means of leaf springs 24 and pairs of coil springs 39 and 41. The natural or free period of vibration of the armature can be adjusted by adjusting either or both nuts 42 and 43, the natural or free period of vibration being shortened by compressing the springs. If the nuts 42 and 43 are unequally adjusted, the air gap between the armature and electromagnet core will be adjusted. However, I prefer to adjust this air gap by means of nuts 26 and 28, and by raising nut 28 the armature assembly may be lowered and locked in lowered position by nut 26.

The vibrator preferably is actuated by unidirectional substantially spaced current impulses obtained by a rectifier from an alternating current source. For example, when the vibrator is thus operated from a fifty cycle alternating current source there will be fifty impacts per second. When the vibrator is intended for vibrating a fixed load or for operating under a constant condition, I prefer to adjust the natural or free period of vibration of the armature and load close to or substantially at the electromechanical resonance point, thereby obtaining a more economical utilization of electrical energy. However, where the load or conditions of operation are variable I prefer to adjust the springs and armature to within about 40% to 70% of electromechanical resonance thus providing a stable forced vibration under variable conditions. The leaf springs 24 serve as impact receiving members which engage anvil 23 and also guide the armature in its vibrations in proper relative alignment with the core. The springs 24 may readily be replaced when they become worn, and thus when new springs are inserted the proper air gap is retained.

In operation, when the coil 17 is energized, the armature is drawn sharply into engagement with the anvil surfaces as shown in Figure 1, thus producing an impacting force upon the base. When the current impulse dies to zero the springs 39 will effect retractive movement of the armature, such retracting movement being cushioned and limited by the springs 41 which will assist in overcoming the inertia of the armature upon the succeeding application of magnetic force thereto.

In the modification shown in Figures 12 and 13, wherein like parts are correspondingly numbered, the base 14 is made of a casting and has integral flanges 60 whereby it is bolted to the object to be vibrated. The bolts 62 at each end pass through the leaf springs 24 and anvil 23 at each end into the base and each bolt receives a nut 63 and a spring type lock washer 64 at their lower end. A grooved clamping piece 65 at each end engages the top leaf of the springs 24 and by means of a nut 66 each bolt 62 is clamped in position and holds the springs at their middles to the base.

Near the top the bolts 62 carry spring clips 68 comprising similar upper and lower plates 69 and 70 having rubber pads 71 and 72 suitably permanently secured thereto. Bosses 73 and 74 engage each other and prevent the leaf springs 75 from being rigidly clamped therein. The spring clips are held in place on bolts 62 by nuts 77 and 78 threaded thereon.

At their center, spring leaves 75 are clamped to an armature casing 81 by a recessed bar 82 and bolts 83 threaded into lugs 84 at the sides of the casing 81. The casing has flanges 85 at its ends to which are secured the springs 24 by clips constructed as described in connection with Figures 1 and 2.

In the modification, the natural period of the armature may be adjusted by shifting spring holders 68 on bolts 62 to flex the springs 75. Movement of holders 68 will also cause flexing of the springs 24. If it is desired to adjust the air gap without changing the natural period of the springs, the nuts 63 and 66 are adjusted to move the bolts 62 and armature assembly relative to the electromagnet 15.

What I claim as my invention and desire to secure by Letters Patent is:

1. In a vibratory or reciprocatory electric motor comprising at least one coil actuated from a source of alternating current voltage through at least one rectifier, and an armature vibrated or reciprocated thereby, the method of control which comprises introducing an impedance in parallel across a rectifier, and varying said impedance to vary the current supplied to the motor.

2. In a vibratory or reciprocatory electric motor comprising at least one coil actuated from a source of alternating current voltage through at least one rectifier, and an armature vibrated or reciprocated thereby, the method of control which comprises introducing a resistance in parallel across a rectifier, and varying said resistance to vary the current supplied to the motor.

3. In a vibratory or reciprocatory electric motor comprising at least one coil actuated from a source of alternating current voltage through at least one rectifier, and an armature vibrated or reciprocated thereby, an impedance connected in parallel across a rectifier, and means to vary said impedance to vary the current supplied to the motor.

4. In a vibratory or reciprocatory electric motor comprising at least one coil actuated from a source of alternating current voltage through at least one rectifier, and an armature vibrated or reciprocated thereby, a resistance connected in parallel across a rectifier, and means to vary said resistance to vary the current supplied to the motor.

5. In an electric motor, a coil, an alternating voltage source, a rectifier for supplying current impulses spaced by substantial zero intervals to said coil, an armature actuated by said coil, an impedance in parallel with said rectifier, and means to vary the impedance to vary the current supplied to said motor.

6. In an electric motor, a coil, an alternating voltage source, a dry disc rectifier for supplying current impulses spaced by substantial zero intervals to said coil, an armature actuated by said coil, and means for varying the inverse voltage impressed on the rectifier in accordance with the current supplied to the motor.

7. A vibrator comprising a base member, an electromagnet member mounted on said base, an armature, spring clips carried by one of said members having rubber pads rigidly secured thereto, leaf springs loosely held at their ends in said clips and secured at their middles to the other of said members, means comprising a rectifier interposed in an alternating current circuit for actuating said electromagnet by substantially spaced current impulses, and a variable impedance in parallel across the rectifier for varying the current supplied to the vibrator.

8. A vibrator comprising a base, an electromagnet mounted on the base, an armature, spring supports secured to the base adjacent the ends thereof, springs carried by said supports secured to said armature, means to adjust said supports relative to the base to adjust the air gap between the armature and electromagnet, means comprising a rectifier interposed in an alternating current circuit for actuating said electromagnet by substantially spaced current impulses, and a variable impedance in parallel across the rectifier for varying the current supplied to the vibrator.

9. A vibrator comprising a base member, an electromagnet member mounted on said base, an armature, spring clips carried by one of said members having rubber pads rigidly secured thereto, leaf springs loosely held at their ends in said clips and secured at their middles to the other of said members, spring supports secured to the base adjacent the ends thereof, springs carried by said supports secured to said armature, means to adjust said supports relative to the base to adjust the air gap between the armature and electromagnet, means comprising a rectifier interposed in an alternating current circuit for actuating said electromagnet by substantially spaced current impulses, and a variable impedance in parallel across the rectifier for varying the current supplied to the vibrator.

10. In a vibratory or reciprocatory electric motor comprising at least one coil for producing at least one magnetic field actuated from a source of alternating current voltage through at least one rectifier, and an armature vibrated or reciprocated thereby, the method of control which comprises introducing an inductance in parallel across a rectifier, and varying said inductance to vary the current supplied to the motor.

11. In a vibratory or reciprocatory electric motor comprising means actuated from a source of alternating current voltage through a rectifier to produce at least one magnetic field, and an armature vibrated or reciprocated thereby, an inductance connected in parallel across a rectifier, and means to vary said inductance to vary the current supplied to the motor.

12. In an electric motor, means to produce a magnetic field, an alternating voltage source, a rectifier for supplying current impulses spaced by substantial zero intervals to said means, an armature actuated by said means, an inductance in parallel with said rectifier, and means to vary the inductance to vary the current supplied to said motor.

13. In an electric motor, means to produce a magnetic field, an alternating voltage source, a rectifier for supplying current impulses spaced by substantial zero intervals to said means, an armature actuated by said means, a resistance in parallel with said rectifier, and means to vary the resistance to vary the current supplied to the motor.

14. A vibratory or reciprocatory electric motor comprising an electromagnet, an armature, spring means secured to said armature and to said electromagnet, a source of alternating current, a rectifier interposed in said alternating current source for supplying current impulses spaced by substantial time intervals to said electromagnet, said armature and spring having a natural periodicity of within 40% to 70% of the periodicity of the current impulses.

15. In an electric motor, a coil, an alternating voltage source, a dry disk rectifier for supplying current impulses spaced by substantial zero intervals to said coil, an armature actuated by said coil, and an impedance connected in parallel across said rectifier, and means to vary said impedance to vary the current supplied to the motor.

CARL S. WEYANDT.